March 3, 1970 D. H. SILVERN 3,498,052
REGENERATIVE COMPOUND ENGINE
Filed July 29, 1968 2 Sheets-Sheet 1

INVENTOR
DAVID H. SILVERN

Peter J. Murphy
ATTORNEY

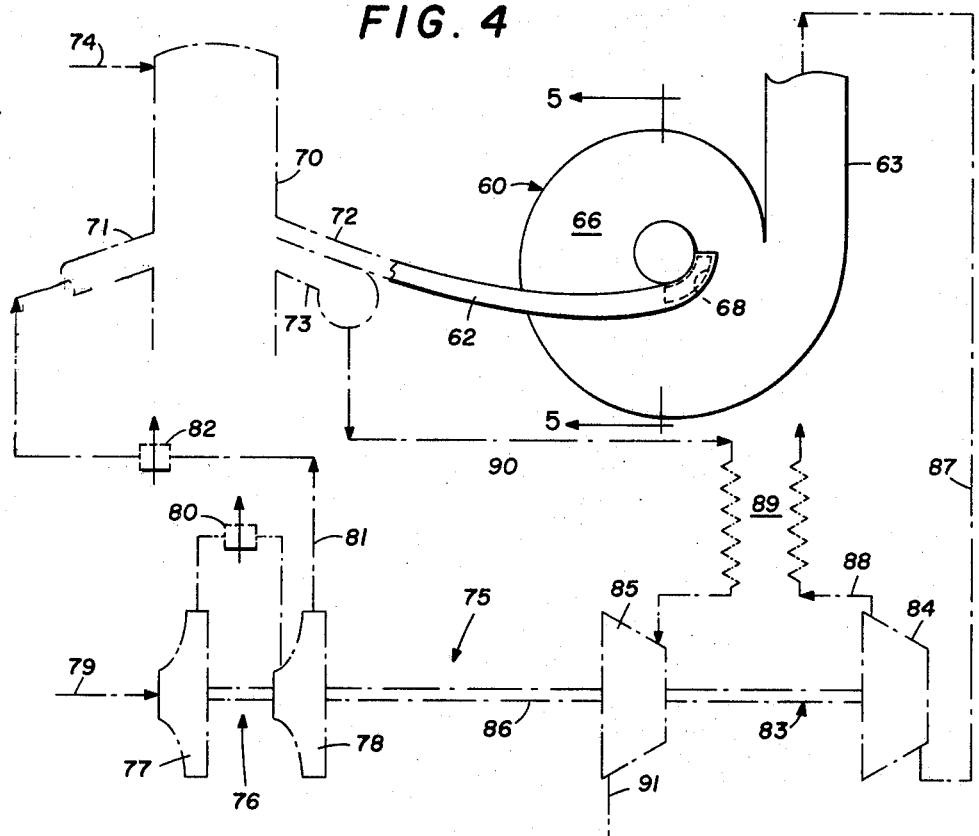
FIG. 4
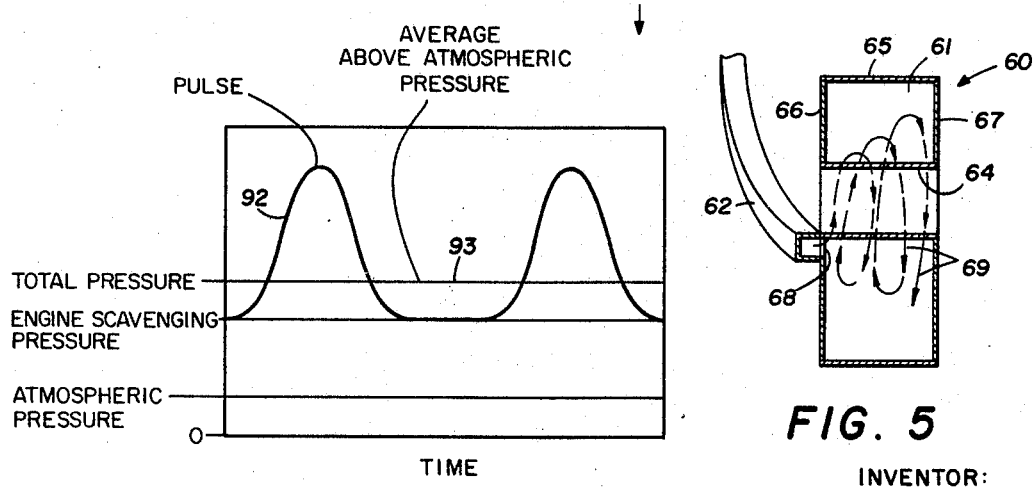
FIG. 6
FIG. 5
INVENTOR:
DAVID H. SILVERN
Peter J. Murphy
ATTORNEY United States Patent Office 3,498,052
Patented Mar. 3, 1970

3,498,052
REGENERATIVE COMPOUND ENGINE
David H. Silvern, Olean, N.Y., assignor to Dresser Industries, Inc., Dallas, Tex., a corporation of Delaware
Continuation-in-part of application Ser. No. 576,259, Aug. 31, 1966. This application July 29, 1968, Ser. No. 748,260
Int. Cl. F02b *41/10, 75/02;* F01k *23/14*
U.S. Cl. 60—13                                          10 Claims

ABSTRACT OF THE DISCLOSURE

A cylinder for a two cycle engine includes a high pressure (blowdown) exhaust port which opens prior to the opening of a low pressure exhaust port; and the exhaust gas streams from these ports are conducted separately from the cylinder. An exhaust driven turbocharger for providing scavenging air includes separate turbine stages which are driven respectively by the separate exhaust gas streams. Exhaust gas from the high pressure exhaust port drives a first turbine stage, and the spent exhaust gas from this first stage is passed in heat exchange relation with the exhaust gas from the second exhaust port which drives the second turbine stage. The exhaust gas from the high pressure port may be conducted through a vortex chamber which converts the pulsating gas stream into a steady flow, more highly pressurized gas stream.

RELATED APPLICATION

This application is a continuation-in-part of application Ser. No. 576,259, filed Aug. 31, 1966, entitled Apparatus For Converting A Pulsating Pressurized Gas Stream Into A Steady Flow More Highly Pressurized Gas Stream, now abandoned.

BACKGROUND OF THE INVENTION

In conventional two cycle engines having a turbocharger for providing scavenging air, the cylinder exhaust ports open to a common manifold for directing all of the exhaust gases to drive the turbine of the turbocharger. These exhaust gases are a mixture of the high temperature gas generated by the two cycle engine and the cooler scavenging air which is forced through the cylinders by the turbocharger compressor. In such engines, a substantial portion of the heat energy inherently generated by the power cylinders is lost by the thermodynamic mixing of these portions before being conducted to the turbocharger turbine.

Furthermore, the pressure of the exhaust gas which drives the turbocharger turbine is unsteady or fluctuating; and the power driving the turbine is substantially less than the power that would be available from a steady flow gas stream.

A primary object of the present invention is to provide a two cycle engine in which the output and efficiency are materially improved. An ancillary object is to provide an improved two cycle engine in which more power is recovered from the exhaust gas of the engine than is normally recovered from a conventional two cycle engine. Another object is to provide an improved two cycle engine in which the heat energy of the exhaust gas of the engine is utilized to the fullest to feed energy back to the engine.

A further object of the present invention is to provide apparatus which converts the unsteady gas stream into a steady flow gas stream at a higher pressure so that the power is available for recovery. A more specific object is to provide apparatus for converting a pulsating exhaust gas stream of a two cycle engine into a steady flow gas stream at a higher pressure which may be utilized to drive the turbine of a turbocharger for such engine.

SUMMARY OF THE INVENTION

The foregoing objects are achieved in a two cycle engine wherein the engine cylinder is provided with first and second exhaust ports and a scavenging air inlet port, and means for opening the first exhaust port prior to the opening of the second exhaust port and the inlet port. Means are provided for conducting the exhaust gas from the first and second ports in respective independent streams for power recovery, and for conducting the higher temperature gas stream from the first exhaust port in heat exchange relation with the lower temperature gas stream from the second exhaust port. The independent gas streams may drive independent stages of the turbine section of a turbocharger, the spent higher temperature exhaust gas from the first exhaust port and its associated turbine stage being passed in heat exchange relation with the gas stream from the second exhaust port conducted to its associated turbine stage. Vortex chamber means may be provided to convert at least one exhaust gas stream into a more steady flow stream.

BRIEF DESCRIPTION OF THE DRAWING

The invention is diagrammatically illustrated by way of example in the accompanying drawing in which:

FIG. 4 is a side elevational view of a vortex chamber apparatus constructed in accordance with the principles of the present invention and showing the same operatively associated with a schematically represented two cycle engine power cylinder with turbocharger;

FIG. 5 is a vertical transverse sectional view of the apparatus taken on line 5—5 of FIG. 4; and FIG. 6 is a graph showing the relationship of pressure to time in connection with the pulsating exhaust gas stream of such a two cycle engine.

DESCRIPTION OF THE PREFERRED EMBODIMENT

Figure 1:
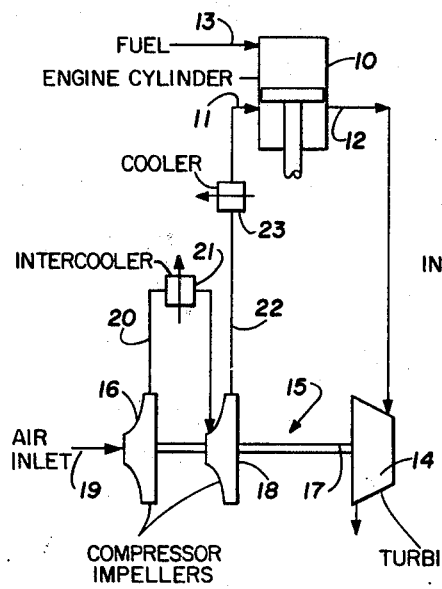
FIG. 1 is a schematic representation of a conventional two cycle engine having a scavenging air turbocharger driven by the exhaust gases from the power cylinder.

FIG. 1 illustrates a conventional two cycle engine having a power cylinder 10 provided with an air inlet port 11 and an exhaust port 12. Fuel is admitted to cylinder 10 at 13. Exhaust gas, discharged from the port 12, drives turbine 14 of a turbocharger 15. The compressor section of the turbocharger includes a first stage impeller 16 and a second stage impeller 18. Air enters the inlet 19 of impeller 16 and is compressed by this stage, flows via conduit 20 having cooler 21 therein to the inlet of second stage impeller 18, then is discharged through conduit 22 to air inlet port 11. Conduit 22 is shown as having a cooler 23 arranged therein. Impellers 16 and 18 and turbine 14 are secured to a common shaft 17.

It is a characteristic of a two cycle engine, as illustrated in FIG. 1, that the exhaust gas generated by the engine power cylinders is mixed with the scavenging air directed through the power cylinder, and that the mixture of exhaust gas and scavenging air is then used to drive the turbocharger. Because of the thermodynamic mixing loss, much of the heat energy extant in the exhaust gas is wasted.

Figure 2:
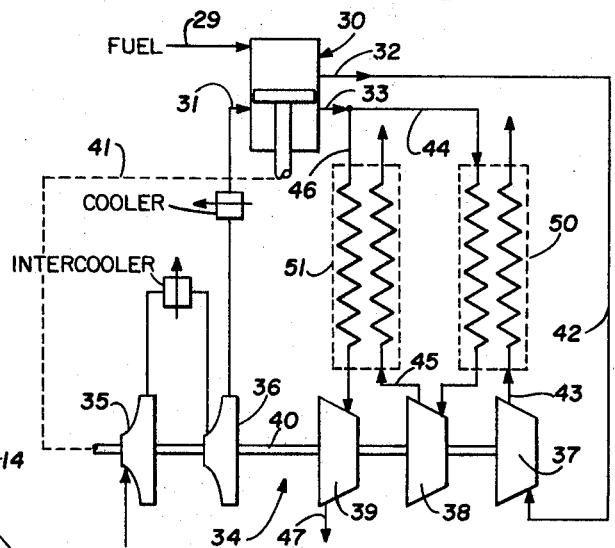
FIG. 2 is a similar schematic representation of a two cycle engine with turbocharger, constructed in accordance with the principles of the present invention.

In accordance with one feature of the present invention, the initial portion of the exhaust gas, which is referred to as blowdown gas, is discharged from the engine cylinder at relatively higher temperature independently from the relatively lower temperature mixture of the terminal portion of the exhaust gas and the scavenging air, which mixture is referred to as scavenging gas. Referring to FIG. 2, a power cylinder 30 of a two cycle engine is provided with a scavenging air intake port 31, a blowdown gas port 32, and a scavenging gas port 33. Fuel is admitted to cylinder 30 at port 29.

Figure 3:
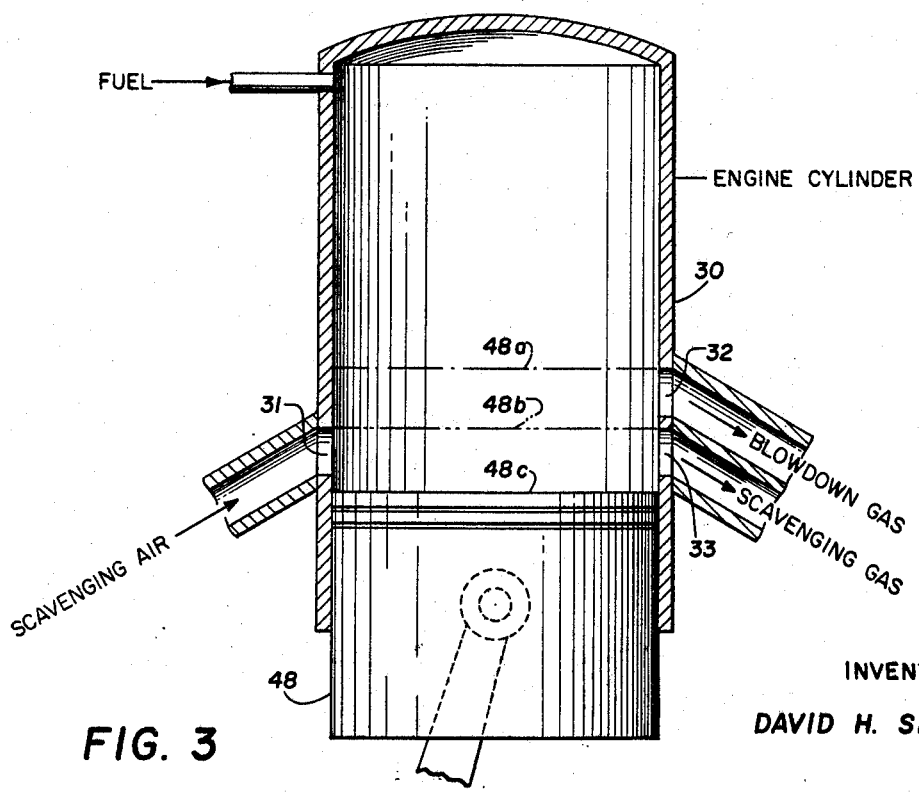
FIG. 3 is an enlarged sectional view of a two cycle engine power cylinder, essentially schematically represented, and illustrating the relation of the inlet and exhaust ports for the cylinder with respect to one another and to the piston reciprocably arranged therein.

Referring to FIG. 3, the arrangement of the ports 31, 32, and 33 is illustrated more clearly in their relation to one another and to a piston 48 which reciprocates within the cylinder 30. During the power stroke of the piston 48 when the piston moves downward from top dead center as viewed in FIG. 3, the top of the piston will descend to levels 48a at which the blowdown gas port 32 is first uncovered; and the blowdown gas is discharged at the temperature and pressure generated by the engine power cylinder through the conduit associated with the discharge port 32. As the piston 48 continues its downward movement, a progressively greater area of the blowdown gas port 32 is uncovered until it is completely uncovered as the top of the piston reaches the level indicated at 48b. At the level 48b, the piston begins to uncover, simultaneously, the scavenging air inlet port 31 and the scavenging gas port 33, these ports being completely uncovered when the top of the piston descends still further to the level indicated at 48c. With the opening of the ports 31 and 33, the lower temperature scavenging gas will be discharged through both the ports 32 and 33; however, it is only the lower temperature scavenging gas which is discharged through the port 33 and its associated manifold or conduit.

Referring again to FIG. 2, a turbocharger represented generally by the number 34 consists of a compressor section, including first and second stage compressor impellers 35 and 36, and a turbine section, including separate turbine wheels 37, 38, and 39. The impellers 35 and 36 and the turbine wheels 37, 38, and 39 are all nonrotatably coupled to a common shaft 40; and the shaft 40 may be coupled by means of any suitable drive mechanism back to the engine as indicated by the dotted line 41. This arrangement of the turbine section of the turbocharged is particularly adapted to an engine where the ratio of the blowdown gas to the scavenging gas from the engine power cylinders is 1:2. With this arrangement, the blowdown gas is conducted from the blowdown port 32 through a conduit 42 to the high temperature turbine wheel 37; and the spent blowdown gas is discharged from the turbine wheel through an exhaust conduit 43. The scavenging gas discharged from the scavenging port 33 is conducted through parallel conduits 44 and 46 to the turbine wheels 38 and 39 respectively; and the spent scavenging gas is discharged from the turbine wheels through conduits 45 and 47 respectively.

The ratio of blowdown gas to scavenging gas is not critical; however, it is desirable that the same mass of gas flows through each of the turbine stages. Where the engine power cylinders are designed, for example, so that the ratio of blowdown gas to scavenging gas is 1:1; then the turbocharger might include only two turbine stages consisting of one high temperature stage for the blowdown gas and one low temperature stage for the scavenging gas. It should be noted that, while the several turbine stages are shown as separate turbine wheels in the illustrated embodiment, the benefits of the invention might as well be achieved by a turbocharger having a turbine section with a single wheel and having separate nozzles for the separate gas streams which have been described.

It is another feature of the invention to provide for the further beneficial utilization of the heat generated in the engine power cylinders, by providing regenerators for heat exchange between the gas streams conducted from the engine power cylinders. Referring again to FIG. 2, there is shown a first regenerator 50 within which the spent blowdown gas from the turbine stage 37 is conducted through the discharge conduit 43 in heat exchange relation with the scavenging gas flowing through the conduit 44 to drive the second turbine stage 38. The scavenging gas stream conducted to the turbine stage 38, then, is at a considerably higher temperature than the scavenging gas stream conducted to the turbine stage 39; and the spent scavenging gas discharged from the turbine stage 38, through the conduit 45 is still at a higher temperature than the scavenging gas stream conducted through the conduit 46. It is advantageous then to provide a second regenerator 51 through which the spent gas from the turbine wheel 38 is passed in heat exchange relation with the gas stream conducted to the last turbine stage 39.

From the foregoing it will be seen that the invention provides an improved two cycle engine which utilizes the heat energy inherently generated in the power cylinders which would otherwise be lost, thereby making available a saving in power resulting in improved engine output and efficiency. It has been demonstrated from calculations of engine systems, according to the invention, that a large excess of power is available at the turbocharger turbine section, over and above that required to drive the compressor section, which power may be fed back into the engine output resulting in improved engine performance.

FIGS. 4 and 5 illustrate apparatus for the present invention for converting a pulsating pressurized gas stream into a steady flow more highly pressurized gas stream. This apparatus is shown as including means represented generally by the numeral 60 providing an annular vortex chamber 61, associated with inlet means 62 for conducting the pulsating gas stream generally tangentially into the inner peripheral margin of chamber 61, and also associated with outlet means 63 for conducting a steady flow stream generally tangentially away from the outer peripheral margin of chamber 61.

Vortex chamber producing means 60 are shown as comprising a scroll-shaped casing having a generally cylindrical inner wall 64, a spirally shaped outer wall 65 surrounding inner wall 64 in spaced relation thereto, and a pair of end walls 66 and 67 joining the corresponding ends of walls 64 and 65 to provide the enclosed vortex chamber 61. Adjacent inner wall 64, end wall 66 is shown as provided with an arcuate opening 68 which communicates with the interior of inlet conduit 62 which is shown as having a rectangular cross section.

The pulsating pressurized gas stream fed into vortex chamber 61, via inlet conduit 62 swirls rotatably about the axis of inner casing wall 64 as depicted by the arrowed lines 69 in FIG. 5.

The outlet for vortex chamber 61 is at the upstream end of outlet conduit 63 where the same is regarded to communicate with the chamber; and at this outlet, which is at a greater radius than that for inlet opening 68, the pressure of the gas will be higher than that adjacent inner wall 64. Thus, a pressure rise occurs between the inner radius and outer radius of the vortex chamber to diffuse the resulting mixture of gas to a higher pressure. The whirling mass of gas in vortex chamber 61 is periodically impinged so-to-speak by incoming pulsating gas. Accordingly, the apparatus may be regarded as an aerodynamic flywheel.

It is important that the volume of vortex chamber 61 be greater than that of a pulse of the incoming pulsating gas stream.

Also, it is important that the cross sectional area of outlet conduit 63 be greater than the cross sectional area of inlet conduit 62.

While the apparatus may be employed for converting any pulsating pressurized gas stream into a steady flow more highly pressurized gas stream, the apparatus is particularly advantageously employed in converting the pulsating exhaust stream of a two cycle engine into a steady flow gas stream at a higher pressure which may then be utilized to drive the turbine of a turbocharger which generates pressurized combustion and scavenging air for such engine.

Such an application of the vortex chamber apparatus is depicted schematically in FIG. 4. As there shown, the numeral 70 represents the power cylinder of a two cycle engine having an air intake port 71 and an exhaust port including a high pressure port 72 and a relatively low pressure port 73. Fuel is shown admitted to cylinder 70 at 74. Inlet conduit 62 of the vortex chamber apparatus is shown as communicating with high pressure port 72. Ports 71, 72 and 73 are uncovered during reciprocation of a piston (not shown) in cylinder 70.

The numeral 75 represents generally a turbocharger which is shown as including a compressor section 76 including a first stage impeller 77 and a second stage impeller 78. Air enters impeller 77 and 79, is discharged to flow through intercooler 80 to the inlet of impeller 78 from whence it is discharged via conduit 81 having cooler 82 operatively arranged therein to be conducted to intake port 71 of the engine cylinder.

The numeral 83 represents a two stage turbine section of turbocharger 75 and is shown as including a high pressure turbine wheel 84 and a low pressure turbine wheel 85. Turbine wheels 84 and 85 and compressor impellers 77 and 78 are all fastened to a shaft 86 whereby the turbine drives the compressor. Outlet conduit 63 of the inventive apparatus is shown as communicating via a conduit represented by the line 87 with the inlet of turbine wheel 84. The exhaust from this turbine wheel passes via conduit 88 through a regenerator 89 and is shown exhausted to the atmosphere. The inlet of the other turbine wheel 85 is shown as connected with low pressure engine exhaust port 78 via a conduit which is represented by the line 90 which also passes through regenerator 89, the gas in conduit 90 flowing in heat exchange relationship with the gas in exhaust conduit 88. The spent gas from turbine wheel 85 is shown at 91 as exhausted to the atmosphere.

In the operation of the two cycle engine represented by cylinder 70, the exhaust gas is collected in two portions. One of these portions is a blowdown portion having a relatively high pressure and temperature which is collected through port 72. The other portion of exhaust gas may be regarded as a scavenging portion and it has a comparatively lower pressure and temperature than that of the blowdown portion.

Referring to FIG. 6, it will be seen that the engine scavenging pressure represented by the curve 92 pulses periodically with the lapse of time, related to the frequency of the reciprocation of the engine piston, and these pulses can be converted by the vortex chamber apparatus 60-69 to a total pressure represented by line 93 which is an average value above atmospheric pressure whereby power may be recovered from the pulsating exhaust gas stream.

From the foregoing, it will be seen that the embodiment of the invention illustrated in FIGS. 4 and 5 achieves the objects stated.

The embodiments of the invention in which an exclusive property or privilege is claimed are defined as follows:

1. In a two cycle engine
a power cylinder having a first exhaust port and a second exhaust port; means for opening said first exhaust port prior to the opening of said second exhaust port;
means for conducting the exhaust gases from said first and second exhaust ports in independent streams for power recovery; and means for passing said independent exhaust gas streams in heat exchange relation with each other to effect transfer of energy from the higher temperature stream after power recovery to the lower temperature stream before power recovery.

2. In a two-cycle engine as set forth in claim 1
said cylinder having a scavenging air inlet port; and means for opening said inlet port substantially simultaneously with the opening of said second exhaust port.

3. In a two cycle engine as set forth in claim 1
said engine further comprising a turbocharger having a compressor section, for providing scavenging air to said power cylinder, and a turbine section having at least two separate stages which are driven by respective independent exhaust gas streams from the said first and second exhaust ports.

4. In a two cycle engine as set forth in claim 3
said turbocharger turbine section including a first high temperature turbine stage, driven by the higher temperature exhaust gases discharged from said first exhaust port, and the second low temperature turbine stage driven by the lower temperature exhaust gases dischaged from said second exhaust port.

5. In a two-cycle engine as set forth in claim 1
said engine comprising an exhaust driven turbocharger for providing the scavenging air to said power cylinder; said turbocharger including a turbine section having high temperature and low temperature turbine wheels;
first conduit means for conducting the higher temperature exhaust gas from said first exhaust port to said high temperature turbine wheel, second conduit means for conducting the lower temperature exhaust gas from said second exhaust port to said low temperature turbine wheel; third conduit means for conducting the spent exhaust gas from said high temperature turbine wheel to atmosphere; and a regenerator for passing the lower temperature exhaust gas from said second exhaust port in heat exchange relation with the higher temperature spent exhaust gas from said high temperature turbine wheel.

6. In a two cycle engine as set forth in claim 1
said engine comprising an exhaust driven turbocharger for providing the scavenging air to said power cylinder; said turbocharger including a turbine section having at least three driving stages;
means for conducting the exhaust gas from said first exhaust port in an independent stream to a first turbine stage; means for conducting the exhaust gas from said second exhaust port in independent second and third gas streams to second and third turbine stages respectively; said first gas stream comprising substantially one-third of the total flow of exhaust gases from said engine power cylinder;
means for directing the spent exhaust gas from said first turbine stage in regenerative heat exchange relation with said second gas stream from said second exhaust port; and means for directing the spent exhaust gas from said second turbine stage in regenerative heat exchange relation with said third gas stream from said second exhaust port.

7. In a two cycle engine
a power cylinder having first and second exhaust ports and means for opening said first exhaust port prior to the opening of said second exhaust port; said first port exhausting a blowdown portion of exhaust gas from said cylinder;
a turbocharger having a compressor section, for providing scavenging air to said cylinder, and a turbine section having first and second stages which are driven by respective exhaust gas streams from said first and second exhaust ports.
means for converting the pulsating gas stream from one of said exhaust ports into a steady flow more highly pressurized gas stream comprising means providing an annular vortex chamber, inlet means for conducting the gas stream generally tagentially into the inner peripheral margin of said chamber, and outlet means for conducting the gas stream generally tangentially away from the outer peripheral margin of said chamber; means for passing the spent blowdown portion from said first turbine stage in indirect heat exchange relation with the exhaust gas flowing from said second exhaust port.

8. In a two cycle engine as set forth in claim 7 a vortex chamber means being provided for converting the gas stream from said first exhaust port.

9. In a two cycle engine as set forth in claim 7 the volume of said chamber being greater than that of a pulse of said pulsating stream entering said chamber.

10. In a two cycle engine as set forth in claim 9 the cross sectional area of said outlet means being greater that that of said inlet means.

References Cited

UNITED STATES PATENTS 1,849,170   3/1932   Buchi _____ 60—13

FOREIGN PATENTS 298,625   7/1954   Switzerland.
818,275   6/1937   France.

MARK M. NEWMAN, Primary Examiner

DOUGLAS HART, Assistant Examiner

U.S. Cl. X.R.

60—32; 123—65